May 31, 1949.  M. VAN HASSELT  2,471,465
REPEATER FOR SUBMARINE ELECTRIC CABLES
Filed Jan. 14, 1947
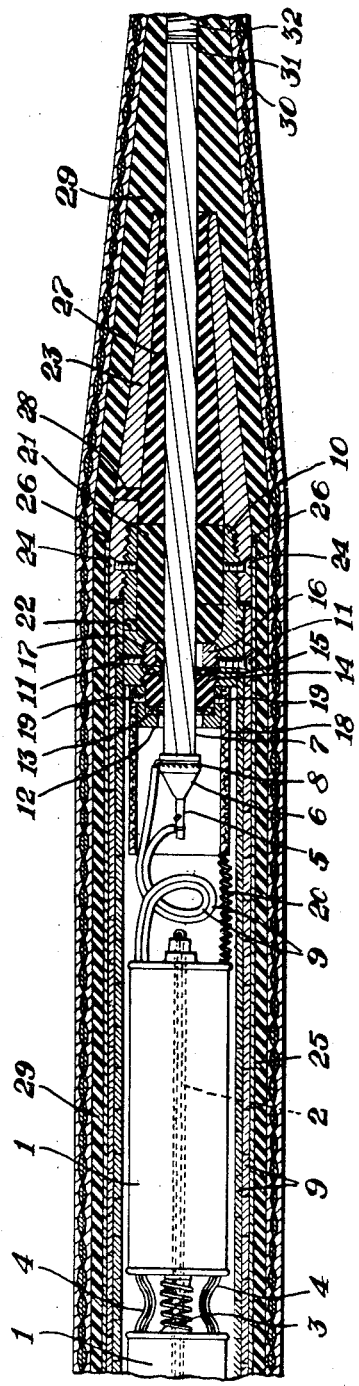
INVENTOR
MARC VAN HASSELT
BY
ATTORNEY Patented May 31, 1949

2,471,465

UNITED STATES PATENT OFFICE 2,471,465

REPEATER FOR SUBMARINE ELECTRIC CABLES

Marc van Hasselt, London, England, assignor to International Standard Electric Corporation, New York, N. Y., a corporation of Delaware Application January 14, 1947, Serial No. 721,893
In Great Britain January 29, 1946

1 Claim. (Cl. 174—74)

This invention relates to repeaters for submarine electric cables, and more particularly to repeaters for such cables of the coaxial type with a solid dielectric.

The housing for such repeaters is of greater diameter than the cable itself, so far as all existing cables or those immediately practicable or contemplated are concerned. Such housing thus cannot be enclosed within the outer conductor of the cable.

It has been proposed, in order to assist in preventing the ingress of moisture into the repeater, to cover the exterior of the housing with dielectric material which is continuous with the dielectric of the cable and to provide an external conductor over the dielectric covering the housing, such external conductor being in the same form, e. g. copper tapes, as the external conductor of the coaxial cable and connected electrically thereto. It is then necessary to make connection between the repeater and the external conductor covering the housing by means of one or more wires embedded in the dielectric.

The disadvantage of this construction is that the electric characteristics of the portion of cable at each end of the repeater housing are different from the main portion of the cable since adjacent to the repeater housing the distance between central and return conductors varies. Moreover the particular dielectric which is most suitable for high frequency transmission, viz. a solid polymer of ethylene (hereinafter called polythene) cannot very readily be made to adhere to metal and there is thus some danger of seepage of water between the wire connecting the external conductor to the repeater and the surrounding polythene.

These difficulties are overcome in the arrangement according to the present invention. According to one feature of this invention a housing for a repeater for a submarine coaxial cable system contains in addition to the repeater two short lengths of coaxial cable (tail cables) of the same diameter as the remainder of the cable to which they are to be connected, the outer conductors of the said lengths of cable being covered with and bonded to a water resistant material which also extends over the exterior of said housing.

According to another feature of the invention a housing for a repeater for use in a submarine coaxial cable system comprises a casing or casings for said repeater, tail cables connected to the input and output of said repeater respectively, said tail cables being of the coaxial conductor solid dielectric type, supporting means for said respective tail cables, a member containing both said casing or casings and said supporting means and a water resistant material extending over and bonded to the exterior of said tail cable and said member.

Since the tail cables comprise both central and return conductors both may be connected to the repeater without passing through any insulating covering for the repeater housing. Since the water resistance material is not within the electric field it need not, strictly speaking, be insulating material, but it is preferred to use an insulating material for this purpose.

The tail cables are preferably of exactly the same construction as the remainder of the submarine cable to which they are to be connected, in so far as the central conductors, dielectric and outer conductors are concerned, but as the greater part of their length is within the housing, there is no need for binding means over this part of their length. As the conductor consists of copper tapes with a long lay it is advantageous that the coating of water resistant material extending over the outer conductors of the tail cables and the repeater housing should bond to the cable dielectric through the interstices between these tapes as well as to the copper tapes themselves. The same consideration would also apply in the case of an outer condition of any kind in which openings are liable to occur in said conductor. In U. S. Patent application No. 623,767, filed October 22, 1945, there is described a process of bonding polythene to copper consisting of first oxidising a surface of copper to cuprous oxide and afterwards pressing polythene when hot against the oxidised surface. In U. S. Patent application No. 623,768 filed October 22, 1945, now abandoned, there is described a process of bonding polythene to metal by passing the metal through a solution of polythene and immediately thereafter evaporating off the solvent at a temperature above the melting point of polythene.

By using either of these processes to form a thin coating of polythene on the tapes used as outer conductors for the tail cables, the above mentioned water resistant material may be polythene, which is bonded to the thin coating on the outer conductors and to the polythene dielectric of the tail cables.

The invention will be better understood from the following description taken in conjunction with the accompanying drawing which shows (partly in cross section) sufficient of the repeater casings and one of the tail cables necessary for the understanding of the present invention.

Referring to the drawing the repeater apparatus is mounted within a series of containers 1 held together by means of a rubber covered steel wire 2 fastened to the outer ends of the outer containers. Compression springs 3 (of which one only is shown) are held between the containers 1 and the electrical connections between the apparatus in the successive containers 1 are made by means of rubber covered wire strands 4.

Each tail cable consists of a central conductor 5, polythene dielectric 6 extruded around the conductor 5 and an outer conductor 7 consisting of copper tapes applied around the dielectric 6 being in these respects exactly similar to the submarine cable to which it is to be connected. In manufacturing the tail cables, however, the copper tapes of the outer conductor 7 are coated with a thin film of polythene by the process described and claimed in one of other of the two specifications mentioned above. After the copper tapes have been applied to the dielectric 6 heat and pressure is applied throughout the length of the tail cable to bond the polythene coating on the tapes 7 to the dielectric 6.

The copper tapes 7 and the dielectric 6 are cut away from one end of each tail cable as shown to expose the inner conductor 5. The polythene film on the end portion of the outer conductor 7 is removed and a copper ferrule 8 is applied so as to grip the ends of the outer conductor. The centre conductor 5 and the ferrule 8 are connected to the apparatus within the adjacent container 1 by means of suitable conductors 9.

The containers 1 and the adjacent ends of each tail cable are supported within a watertight flexible steel pipe 9 formed of inner and outer interlocking steel helices. A steel plug 10 is secured centrally of the end of the flexibe pipe 9 by means of screws 11. Fitting against an interior portion 12 of the plug 10 is a compressed fibre disc 13, a rubber sealing member 14 and a second compressed fibre disc 15, all surrounding closely the tail cable and compressed against the portion 12 of plug 10 by a brass nut 16 which screws into an interiorly threaded portion 17 of the plug 10. A split cylinder 18 of compressed fibre covers the connections between the conductor 5 and ferrule 7 and the connecting wires 9 and is secured to plug 10 by screws 19. The fibre cylinder 18 is connected to the adjacent container 1 by means of two tension springs (one only 20 of which is shown) to restrict the free movement of containers 1 within the pipe 9.

The plug 10 and the parts 12, 13, 14, 15 and 16 are assembled over the end of the tail cable before the tail cable is inserted into the end of flexible pipe 10 and at this time also the open end of plug 10 is filled with polythene 21 through an injection hole or holes 22. A tapered steel member 23 is then screwed on the exterior of plug 10 and locked in position by locking screws 24.

It should be noted here that the exterior of the flexible steel pipe 9 is covered with a close fitting copper cylinder 25 which extends sufficiently beyond the ends thereof to cover the locking screws 24 when the pipe 9 and cylinder 25 are slid over the plug 10 with the tapered portion 23 attached thereto. The end of the copper cylinder when in position is soldered to the tapered portion 23 as indicated at 26. The external surface of copper cylinder 25 has been initially coated with a thin adherent film of polythene by either of the methods described in the above mentioned specifications.

Heated polythene is then injected into the space 27 within the tapered portion 23 under pressure through an injection opening 28 until it completely fills the interior of this tapered portion and also extends through the injection opening 28. The polythene filling the space 27 will bond to the polythene 21 and also to the thin polythene film bonded to the outer conductor tapes 7 of the tail cable. Further polythene 29 is then applied to an easy taper to cover the whole of the remaining portion of the tail cables and the exterior of the copper cylinder 25 and heat and pressure applied to bond it to the exterior surfaces of this cylinder 25 and the tail cables. Armouring 30 is then applied over the whole.

It should be noted that the position of the tail cable at the end to be joined to the main body of the submarine cable includes a close helix 31 of copper wire and a binding 32 of rubberized tape thereover. These are not continued over the whole length of the tail cable in order to allow the polythene 29 to bond the copper tapes of the return conductor 7 and so form a barrier to the seepage of water into the repeater.

The arrangement as described is made in the factory and is ready to be inserted as part of a submarine coaxial solid dielectric cable. The ends are joined to lengths of the cable, either in the factory or on the cable ship, using ordinary joining technique.

What is claimed is:

A housing for receiving and protecting against moisture under deep sea conditions electrical apparatus to be included in a submarine coaxial cable system, that comprises: a pressure-resistant watertight flexible metal tube defining a chamber for receiving said apparatus; a pair of hollow substantially conical metal plugs, having a maximum diameter substantially equal to the diameter of the flexible tube and each having a hollow tubular shank on the base thereof receivable in an open end portion of said flexible tube, the internal portions of said plugs and shanks being adequately large to receive the external conductor of the coaxial cable without physical or electrical contact therewith; a coaxial cable end portion in each of said plugs extending through the shank thereof; water-impervious electrical insulation in said internal portions of the plugs and shanks, filling the space surrounding the coaxial cable ends; a close-fitting copper sheath surrounding the flexible metal tube and sealed to base portions of the plugs in the ends thereof; a water-impervious continuous adherent coating of polythene overlying said copper sheath, the conical plugs and a portion of the coaxial cable external conductor extending from the plugs; and outer armoring around the entire assemblage.

MARC van HASSELT.

REFERENCES CITED

The following references are of record in the file of this patent:

UNITED STATES PATENTS

| Number | Name | Date |
| --- | --- | --- |
| 2,043,341 | Turechek | June 9, 1936 |
| 2,122,118 | Studt | June 28, 1938 |
| 2,158,492 | Bishop | May 16, 1939 |
| 2,292,358 | Bishop | Aug. 11, 1942 |

OTHER REFERENCES

Post Office Electrical Engineering Journal, vol. 37, part 2, July 1944, pages 40 to 44. "Polythene and Its Uses as a Dielectric," E. G. Williams.